June 23, 1970  F. W. SINDEN  3,516,623
STATION KEEPING SYSTEM
Filed Sept. 14, 1966
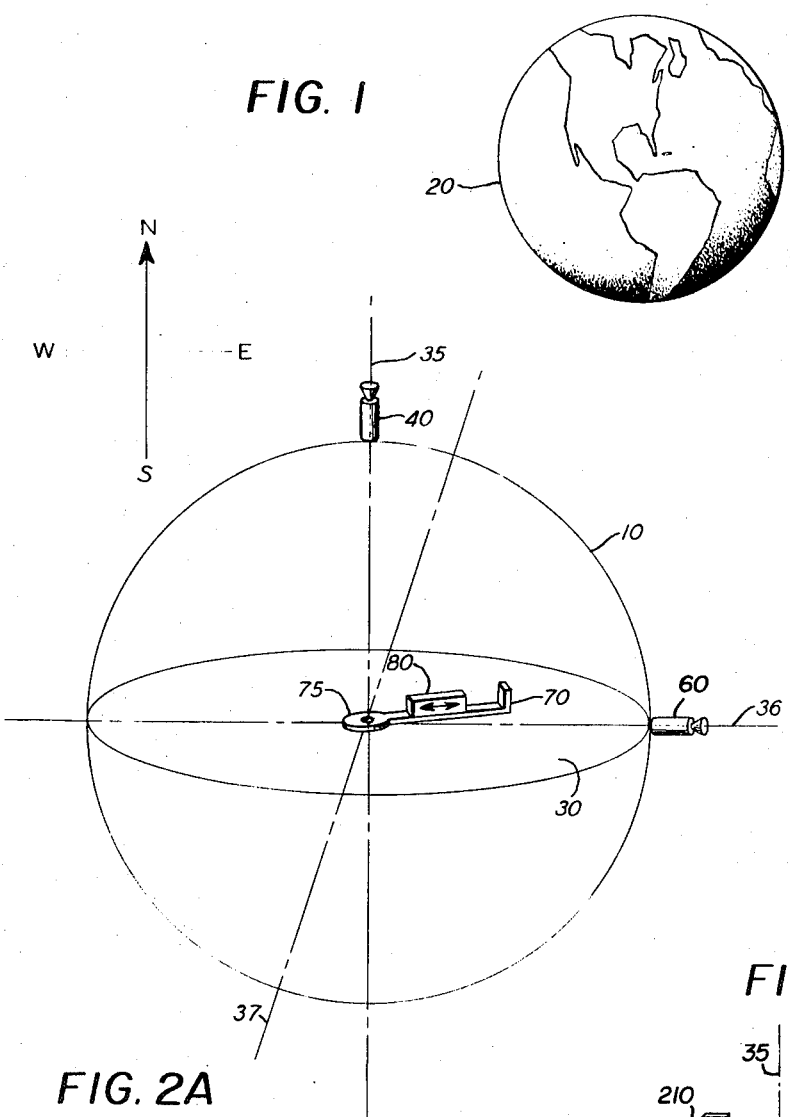
FIG. I
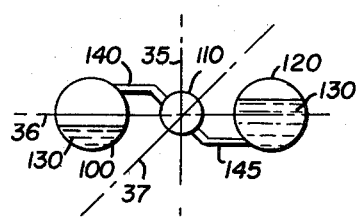
FIG. 2A
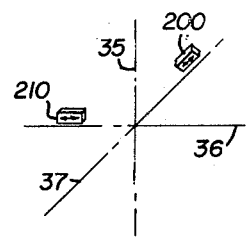
FIG. 2B
INVENTOR
F.W. SINDEN
BY R.O. Nimtz
ATTORNEY United States Patent Office 3,516,623
Patented June 23, 1970

3,516,623
STATION KEEPING SYSTEM
Frank W. Sinden, Summit, N.J., assignor to Bell Telephone Laboratories, Incorporated, Murray Hill and Berkeley Heights, N.J., a corporation of New York
Filed Sept. 14, 1966, Ser. No. 579,393
Int. Cl. B64g 1/10
U.S. Cl. 244—1    6 Claims

ABSTRACT OF THE DISCLOSURE

A system for simultaneously providing station keeping and attitude control for a synchronous satellite is described. Two rockets or similar propulsion means aligned on perpendicular axes provide simultaneously the necessary thrust for station keeping and, in cooperation with means for shifting the center of gravity of the satellite, the torque required to maintain correct orientation.

This invention relates to control systems. More particularly this invention relates to systems for controlling the location and orientation of remote objects. Still more particularly, this invention relates to a system to provide station keeping and attitude control for an earth satellite.

Recent developments in the earth satellite field have included the deployment in space of several so-called synchronous satellites. These satellites move in an orbit of such a radius that their angular velocity is exactly the same as the angular velocity of the earth. Thus these newer satellites maintain a norminally fixed position relative to the earth. Typically, a synchronous satellite is positioned over a fixed point on the equator, thus being visible to signals emanating from both the northern and southern hemispheres.

The advantages of such an arrangement are manifold in the field of satellite communications. For example, with a synchronous satellite it is possible for two widely separated points on earth to be in constant communication with each other despite extensive atmospheric or other disturbances along the intervening terrestrial path. No tracking equipment or movable ground station antennas are required. Furthermore, the use of directional satellite antenna systems allows more efficient use to be made of satellite transmitted power, resulting in higher received signal levels at the message destination.

As might be expected, there are certain difficulties encountered in achieving the full benefit of a truly synchronous satellite system. These difficulties include those associated with keeping the satellite at its correct position relative to the earth despite small perturbing forces acting to the contrary, i.e., station-keeping. There are two main sources of perturbing forces: (1) solar and lunar gravitation, and (2) nonsphericity of the earth's gravitational field. Other disruptive forces may affect the position of a synchronous satellite either randomly or accordingly to some schedule, but they are either too insignificant or too infrequent to warrant the provision of corrective measures aboard a satellite.

Solar and lunar gravitation cause the satellite orbit to precess relative to the ecliptic. The effect of this, as seen from the earth, is to make the satellite oscillate diurnally north and south from its nominal position over the equator. As time passes the amplitude of the oscillations tends to grow at the rate of about one degree per year.

For a satellite located approximately at the longitude of the central United States, the effect of the nonsphericity of the earth's gravitational field is to cause a slow westward acceleration of approximately $1.7 \times 10^{-3}$ degrees per day.

A problem not unrelated to station keeping is that of attitude control, i.e., maintaining the correct orientation of a satellite relative to a terrestrial reference frame. This is especially important for any communication satellite having directional transmitting antennas if reliable communication is to be maintained. Attitude control relates exclusively to controlling rotation of the satellite relative to its own center, just as station keeping relates to controlling translation of the satellite relative to the earth. In addition to overcoming natural forces such as solar radiation, meteorite collisions and such, an attitude control system must be effective against undesired rotation introduced by the station keeping system.

Present synchronous communication satellites are often of the so-called spin-stabilized variety. The orientation of these satellites is maintained by the gyroscopic effect of constant rotation. One variety transmits energy in a symmetrical pattern about the spin axis. Because only a very small segment of this transmitted energy is incident on the terrestrial receiving station, these satellites are relatively inefficient. Another variety of spin-stabilized satellite provides a phased-array antenna system that causes a relatively narrow antenna beam to sweep about the spin axis at the same rate that the satellite itself is rotating, but with opposite direction. The effect of this is to maintain the antenna beam over approximately the same point on earth. Of course these oppositely-directed rotations are accomplished only with a considerable increase in complexity.

It is therefore an object of the present invention to provide a simplified system for simultaneously controlling the position and attitude of a satellite or other remote body. It is another object of the present invention to provide a high-accuracy station-keeping and attitude control system for a synchronous satellite without relying on constant spinning of the satellite.

Briefly stated, this invention provides two rockets or other propulsion means aligned on perpendicular axes. A mass constrained to move in the plane perpendicular to one of the axes is used to shift the center of mass of the satellite and hence the moment arm over which the rockets act. Thus, while providing the thrust necessary to return an errant satellite to its correct station, the system simultaneously provides a torque to either counteract any undesired angular momentum that may exist or tend to correct any existing misdirection or both.

Other objects and advantages of the present invention will become more apparent by referring to the following detailed description and associated drawings wherein FIG. 1 shows a schematic representation of one embodiment of the present invention. FIGS. 2A, B show alternate means for changing the position of the center of mass.

The drawing shows an earth satellite 10 in a nominally stationary position above the earth 20. It is assumed that it is desired that the satellite be in the earth's equatorial plane. Plane 30 is shown in (or parallel to) the earth's equatorial plane. Rocket 40 is directed along an axis 35 perpendicular to plane 30. Rocket 60 is directed along an axis 36 in the plane 30 and passing through the axis 35. A mass 80 is constrained to move along an arm 70 which, in turn, is constrained to rotate in the plane 30 around axis 35 by means of pivot member 75.

The remaining portions of the satellite, not shown in detail, are so distributed throughout the satellite volume that the satellite's center of mass lies near or at the intersection of the axis 35 and the plane 30. Thus, by suitably translating the mass 80 along the arm 70 and rotating this arm, it is possible to move the center of mass over an appreciable range in the plane 30.

The precession due to lunar and solar gravitation is counteracted by means of rocket 40, which is fired when the satellite is at or near the ascending node, i.e., passing over the equator from south to north. Another rocket, thrusting northward, could be provided to allow corrections to be made near the descending node as well. Although such a redundant rocket might be desirable for some applications for convenience and reliability, it is not essential to the present invention.

The longitudinal drift of the satellite is corrected by means of rocket 60. As mentioned earlier, the nonsphericity of the earth causes the satellite to drift slowly from its desired station to one over a more westerly point on earth. It would appear at first that the correction for this drift would be made by means of an eastward thrusting rocket. A closer analysis, however, shows that this achieves an exactly opposite purpose, i.e., the satellite drifts farther west. This is so because any increase in velocity in an eastward direction causes the satellite's orbit to expand, thereby causing its period to lengthen. If the satellite's period is longer than 24 hours, it will fall behind relative to a fixed point on earth, and therefore drift westward. Thus, paradoxically, to correct the westward drift, the rocket 60 thrusts in a westward direction.

Attitude control is accomplished by means of the same thrust of rockets 40 and 60 which correct station-keeping errors. Unwanted rotation is checked by shifting the center of mass to such a position that the next station-keeping thrust will tend to counteract the undesired angular momentum. Thrusts of rocket 60 can counteract angular momentum about axis 35 and thrusts of rocket 40 can counteract angular momentum about any axis in plane 30. A succession of two thrusts, one from rocket 60 and the other from rocket 40, each preceded by an appropriate setting of mass 80, can absorb angular momentum about any axis.

More particularly, angular momentum about axis 35 can be checked by aligning arm 70 along axis 37 and setting mass 80 an appropriate distance from pivot 75 (the greater the distance, the greater the countermoment) preparatory to firing rocket 60. Angular momentum about any axis in plane 30 can be checked by aligning arm 70 perpendicularly to that axis and setting mass 80 an appropriate distance from pivot 75 preparatory to firing rocket 40. The effects of two successive thrusts add vectorially. Since a moment about any axis can be generated as the resultant of a moment about axis 35 and a moment about an axis in plane 30, angular momentum about any axis can be countered by successive thrusts from the two rockets. The angular momentum thus provided subtracts from the linear momentum imparted by the rocket for station keeping, but the former is so small compared to the latter as to be entirely negligible. It should be noted also that if the three principal moments of inertia of the satellite are not all equal, then the angular momentum vector and the instantaneous angular velocity vector may differ in direction. However, given the moments of inertia (for all practical purposes fixed) and the instantaneous angular velocity (obtained from sensing instruments, which might well be earthbound) it requires only a simple calculation to obtain the angular momentum vector and hence the proper setting for the center of mass. These calculations can easily be automated by known techniques.

Note that the strength of the rocket thrusts need not be variable; the magnitude and direction of the imparted moments can be determined solely by the position of the center of mass within plane 30 and the choice of rocket to be fired. The variable thrust required for station keeping can be achieved by varying the frequency of the thrusts.

Typically, rocket 60 is fired every few hours or in some cases, every few minutes. Rocket 40 typically is fired several times each day at about the time of the satellite's passage through the ascending node. Of course, in those applications where variable thrust rockets are present, more flexibility in the placement of the center of mass is available.

The invention described above is seen to provide means for keeping a satellite on station and for canceling any undesired angular momentum that may exist. This invention also provides means for correcting any undesired rotation that may have occurred due to undesired angular momentum. If the torque applied is more than sufficient to cancel the unwanted angular momentum, a rotation in the direction of the torque will ensue. Thus, if a satellite acquires undesired angular momentum $M_1$, a torque is applied which has magnitude sufficient to overcome $M_1$, and, in addition, to give rise to angular momentum $M_2$ oppositely directed with respect to $M_1$. $M_2$ is then allowed to exist until any rotation accumulated due to $M_1$ had been recouped; a new torque is then applied to cancel $M_2$.

Various elements of the embodiment shown in the figure can be eliminated or replaced by equivalent elements. For instance, the combination of the arm 70 and mass 80 could easily be replaced by any well-known mechanical equivalent such as two or more masses constrained to move along orthogonal axes in the plane 30. FIG. 2B illustrates such a system wherein masses 200 and 210 are constrained to move along axes 37 and 36, respectively. Another obvious way of shifting the center of mass would be to pump fuel from one storage tank to another to redistribute the fuel mass. FIG. 2A illustrates such a system wherein fluid 130 is distributed between storage tanks 100 and 120 through conduits 140 and 145 by a pump 110. While the distribution system shown will cause a shift in the center of mass only relative to axis 37 in plane 30, additional distribution systems can be easily provided to change the position of the center of mass with respect to axis 36 or any other axis in plane 30. In any of these cases the activating motors can drive counter rotating masses so there is no net reaction to upset the satellite's attitude. Each of the rockets could similarly be replaced by any device capable of exerting a force in predesignated directions.

No attempt has been made to exhaustively enumerate the many variations implicit within the spirit of the present invention. Other variations and embodiments will occur to those skilled in the art.

What is claimed is:

1. A control system for maintaining the position and orientation of a body comprising
   a plurality of normally quiescent directional forcing means fixedly attached to said body,
   mass means movably attached to said body,
   means for selectively moving said movably attached mass means with respect to the center of said body, thereby varying the moment arms of said plurality of directional forcing means,
   and means for selectively activating particular ones of said plurality of directional forcing means so as to produce both a translation and a rotation of said body.

2. A system as in claim 1 wherein said plurality of normally quiescent directional forcing means comprises two rockets directed along perpendicular axes.

3. A system as in claim 2 wherein said movably attached mass means is constrained to move in a plane perpendicular to one of said axes.

4. A system as in claim 1 wherein said mass means movably attached to said body comprises a rotatable arm and a mass constrained to move along said arm.

5. A system as in claim 1 wherein said mass means movably attached to said body comprises a plurality of tanks, a quantity of fluid, and pumping means to distribute said fluid among said tanks.

6. A system as in claim 1 wherein said mass means movably attached to said body comprises a plurality of masses constrained to move along orthogonal paths.

(References on following page)

References Cited

UNITED STATES PATENTS

| | | | |
|---|---|---|---|
| 1,853,233 | 4/1932 | Schwarz | 244—93 |
| 3,056,565 | 10/1962 | Griffith | 244—12 |
| 3,421,715 | 1/1969 | Cohlan | 244—1 |
| 2,960,294 | 11/1960 | Johnston et al. | 244—93 X |
| 2,963,245 | 12/1960 | Bolton | 244—93 |
| 3,073,550 | 1/1963 | Young | 244—14 |
| 3,180,084 | 4/1965 | Meeks. | |
| 3,258,223 | 6/1966 | Skov. | |

FERGUS S. MIDDLETON, Primary Examiner

U.S. Cl. X.R.

244—3.1